(12) United States Patent
Shinde

(10) Patent No.: US 11,802,642 B2
(45) Date of Patent: Oct. 31, 2023

(54) HYDRAULIC SWIVEL

(71) Applicant: The Boeing Company, Chicago, IL (US)

(72) Inventor: Jagdish L. Shinde, Bangalore (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/469,567

(22) Filed: Sep. 8, 2021

(65) Prior Publication Data

US 2022/0120367 A1 Apr. 21, 2022

Related U.S. Application Data

(60) Provisional application No. 63/094,784, filed on Oct. 21, 2020.

(51) Int. Cl.
*F16L 27/093* (2006.01)
*B64D 47/00* (2006.01)

(52) U.S. Cl.
CPC ............ *F16L 27/093* (2013.01); *B64D 47/00* (2013.01)

(58) Field of Classification Search
CPC . F16L 27/093; F16L 27/0945; F16L 27/0849; F16L 27/0812; F16L 27/0804; F16L 27/0816; F16L 27/0837
USPC .................................................. 285/275, 280
See application file for complete search history.

(56) References Cited

U.S. PATENT DOCUMENTS

| | | | | |
|---|---|---|---|---|
| 2,269,431 A * | 1/1942 | Allen | ................... | F16L 27/0845 285/276 |
| 2,745,682 A * | 5/1956 | Chevallier | .......... | F16L 27/0845 285/272.1 |
| 2,943,868 A * | 7/1960 | Hanback | ............... | F16L 27/093 285/190 |
| 3,125,360 A * | 3/1964 | Ulrich | ................... | F16L 27/093 285/190 |
| 4,804,206 A * | 2/1989 | Wood | ................... | F16L 27/0849 285/321 |
| 4,823,835 A * | 4/1989 | Chu | ..................... | F16L 27/093 137/557 |
| 8,333,410 B2 * | 12/2012 | Boticki | ............... | F16L 37/0985 285/127.1 |
| 2010/0102550 A1* | 4/2010 | Hama | ................ | F16L 27/0845 285/127.1 |
| 2021/0116063 A1* | 4/2021 | Chung | ................ | F16L 27/0837 |

* cited by examiner

*Primary Examiner* — David Bochna
(74) *Attorney, Agent, or Firm* — Kwan & Olynick LLP

(57) ABSTRACT

Described are systems and methods for a hydraulic swivel. The hydraulic swivel receives fluid flow in one direction and, in certain configurations, changes the direction of the fluid flow to a second direction before the fluid leaves the hydraulic swivel. The hydraulic swivel includes a first banjo, a second banjo, and a base. The banjos of the hydraulic swivel are configured to be repositioned.

20 Claims, 12 Drawing Sheets

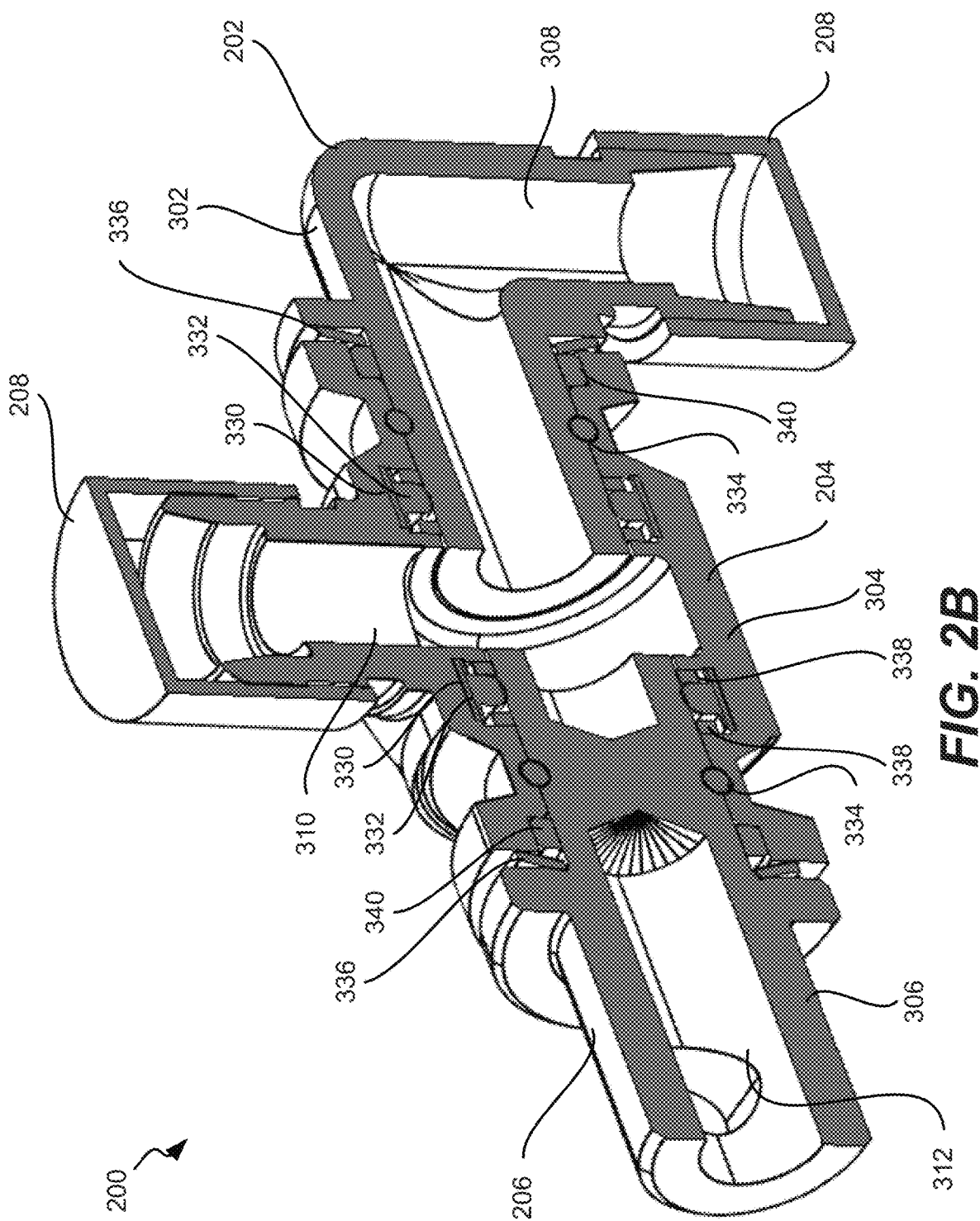

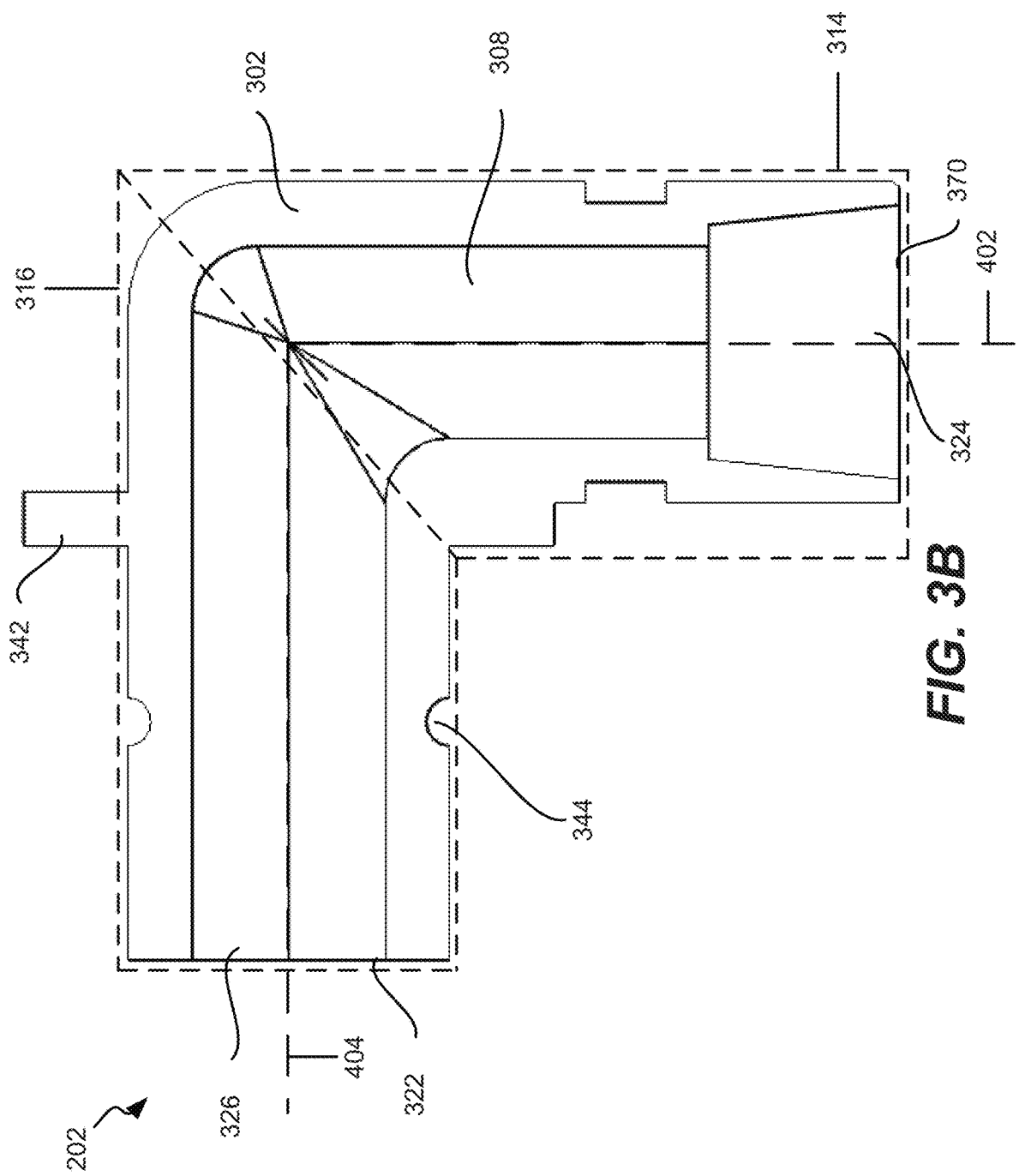

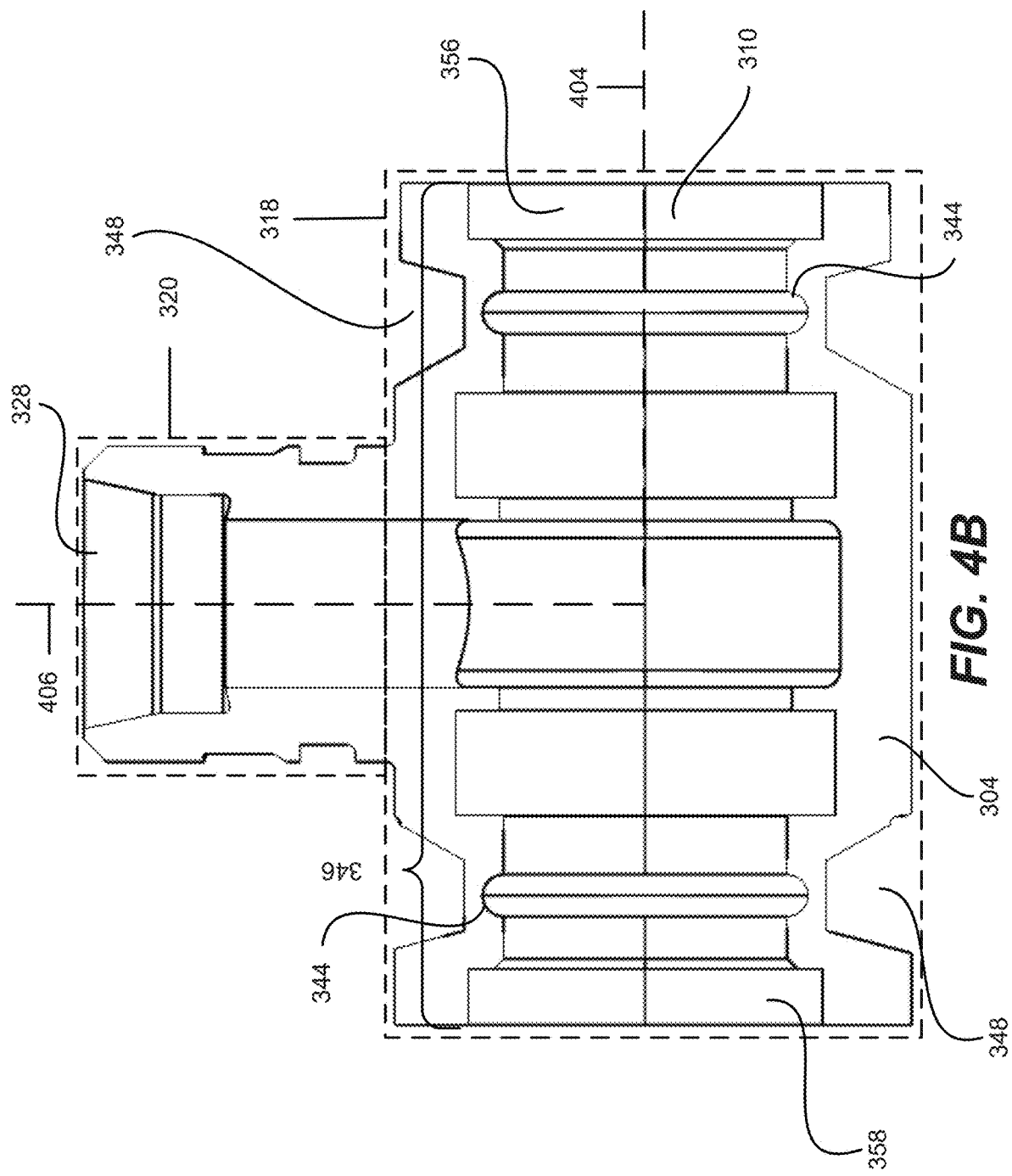

HYDRAULIC SWIVEL

CROSS-REFERENCE TO RELATED APPLICATIONS

This application claims the benefit under 35 U.S.C. § 119(e) of US Provisional Patent Application 63/094,784, filed on 2020 Oct. 21 and entitled "Hydraulic Swivel," which is incorporated herein by reference in its entirety for all purposes.

BACKGROUND

Aircraft and other vehicles often include hydraulic lines. Some hydraulic lines require a change in the direction of flow in the middle of the line. Sometimes, the hydraulic lines are required to be repositioned during operation of the vehicle. Typically, angular positions of such hydraulic lines are changed through swivel couplings. However, typical hydraulic swivel couplings include high parts counts and a large amount of seals, increasing production cost and potential failure points.

SUMMARY

Described are methods and systems for a hydraulic swivel. Systems described herein include a hydraulic swivel disposed within an aircraft. The hydraulic swivel includes a first banjo, a second banjo, and a base. The first banjo includes a first banjo first portion that includes a first end, a first banjo second portion that includes a second end and is disposed at an angle to the first banjo first portion, and a first banjo channel, extending from the first end to the second end. The base is disposed substantially in line with the first banjo second portion. The second banjo includes a second banjo first portion, a second banjo second portion, and a second banjo channel. The second banjo first portion includes a first side, coupled to the first banjo second portion, the first side configured to allow relative rotation between the first banjo and the second banjo, and a second side, coupled to the base, the second side configured to allow relative rotation between the base and the second banjo. The second banjo channel is fluidically coupled to the first banjo channel and includes a channel opening disposed on an end of the second banjo second portion opposite the second banjo first portion.

Illustrative, non-exclusive examples of inventive features according to present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various examples.

FIGS. 2B and 2C illustrate cutaway views of the hydraulic swivel of FIG. 2A, in accordance with some examples.

FIG. 3B illustrates a cutaway view of the first banjo of FIG. 3A, in accordance with some examples.

FIG. 4B illustrates a cutaway view of the second banjo of FIG. 4A, in accordance with some examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Introduction

Described herein is a hydraulic swivel. The hydraulic swivel receives fluid flow in one direction and, in certain configurations, changes the direction of flow to a second direction before the fluid leaves the hydraulic swivel. The banjos of the hydraulic swivel are configured to be repositioned based on the configuration of the aircraft. The hydraulic swivel described herein includes a reduced number of parts and seals (reduced parts count) compared to conventional techniques, reducing cost and potential points of failures. A smaller number of seals results in a lighter and more compact hydraulic swivel. The weight and space savings is valuable in a vehicle application. Furthermore, the reduced number of seals decreases the frictional force involved in repositioning the banjos, allowing for reduced stress on hydraulic lines.

The hydraulic swivel includes a first banjo, a second banjo, and a base. The first banjo includes a first banjo first portion that includes a first end, a first banjo second portion that includes a second end and is disposed at an angle to the first banjo first portion, and a first banjo channel, extending from the first end to the second end. The base is disposed substantially in line with the first banjo second portion. The second banjo includes a second banjo first portion, a second banjo second portion, and a second banjo channel. The second banjo first portion includes a first side, coupled to the first banjo second portion, the first side configured to allow relative rotation between the first banjo and the second banjo, and a second side, coupled to the base, the second side configured to allow relative rotation between the base and the second banjo. The second banjo channel is fluidically coupled to the first banjo channel (e.g., fluid is able to move from the first banjo channel to the second banjo channel and/or vice versa) and includes a channel opening disposed on an end of the second banjo second portion opposite the second banjo first portion.

Figure 1:
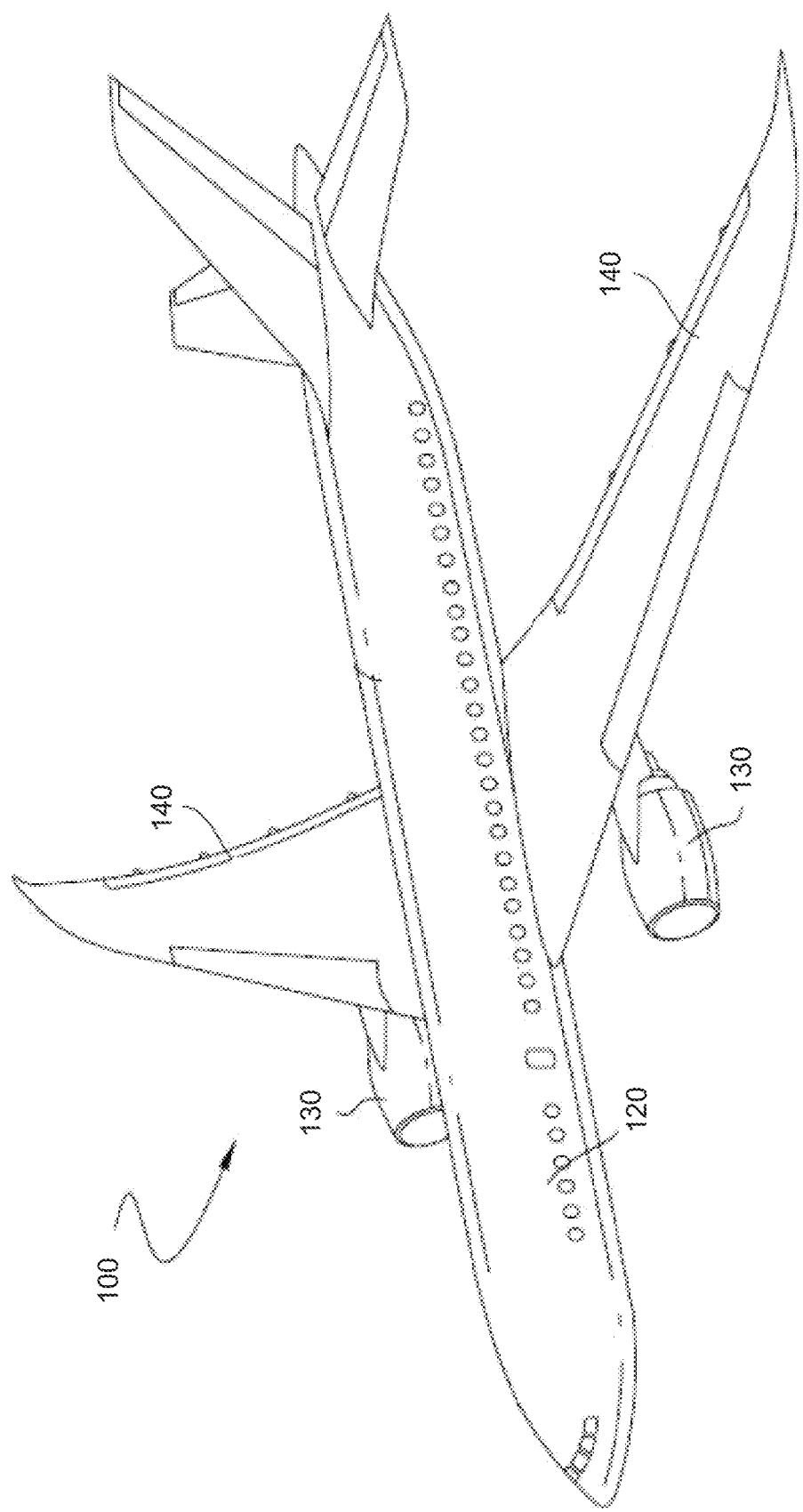
FIG. 1 illustrates a vehicle, in accordance with some examples.

An example of a vehicle equipped with the hydraulic swivel is shown in FIG. 1. FIG. 1 illustrates vehicle 100 that can be a fixed wing aircraft, but other examples can include other structures (e.g., helicopters, variable wing aircraft, short takeoff and landing aircraft, spacecraft, drones, and other such vehicles).

Vehicle 100 includes fuselage 120, wings 140, and aircraft propulsors 130. Each of aircraft propulsors 130 are coupled to a respective wing 140. Wings 140 are coupled to fuselage 120. Vehicle 100 further includes hydraulic lines 150 and 160 disposed within various portions of vehicle 100 (e.g., within fuselage 120, wings 140, and/or aircraft propulsors 130). Hydraulic lines 150 and 160 are not shown in FIG. 1, but are illustrated in FIGS. 2B and 2C. Hydraulic lines 150 and 160 are lines of vehicle 100 configured to carry a fluid (e.g., a liquid or gas) to aid in operation of vehicle 100. Hydraulic lines 150 and 160 allow for pressurization of various systems of vehicle 100 or delivery of fluid in other manners for operation of aircraft 100.

Examples of Hydraulic Swivels and Components Thereof

Figure 2A:
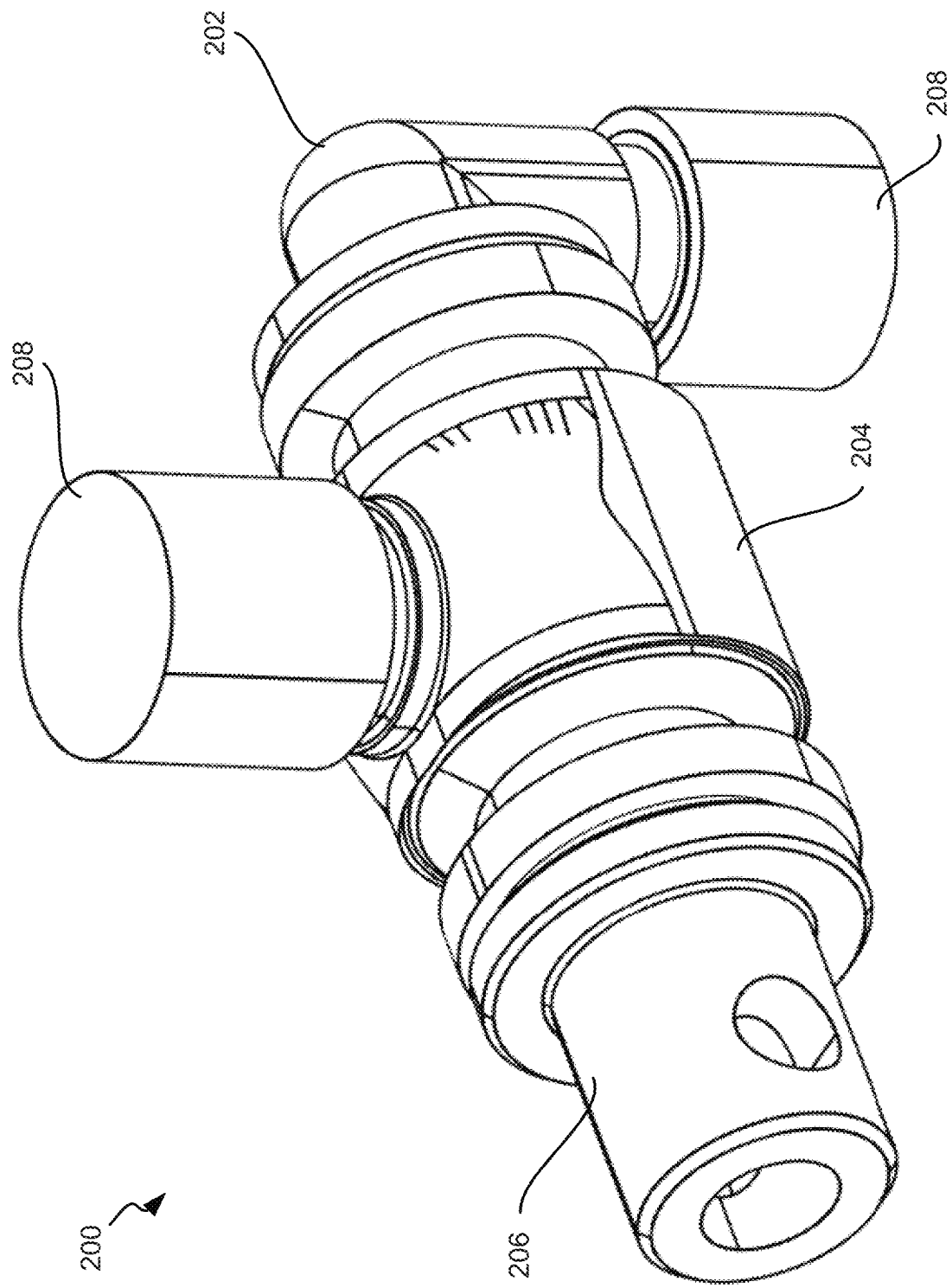
FIG. 2A illustrates a perspective view of a hydraulic swivel, in accordance with some examples.
Figure 2C:
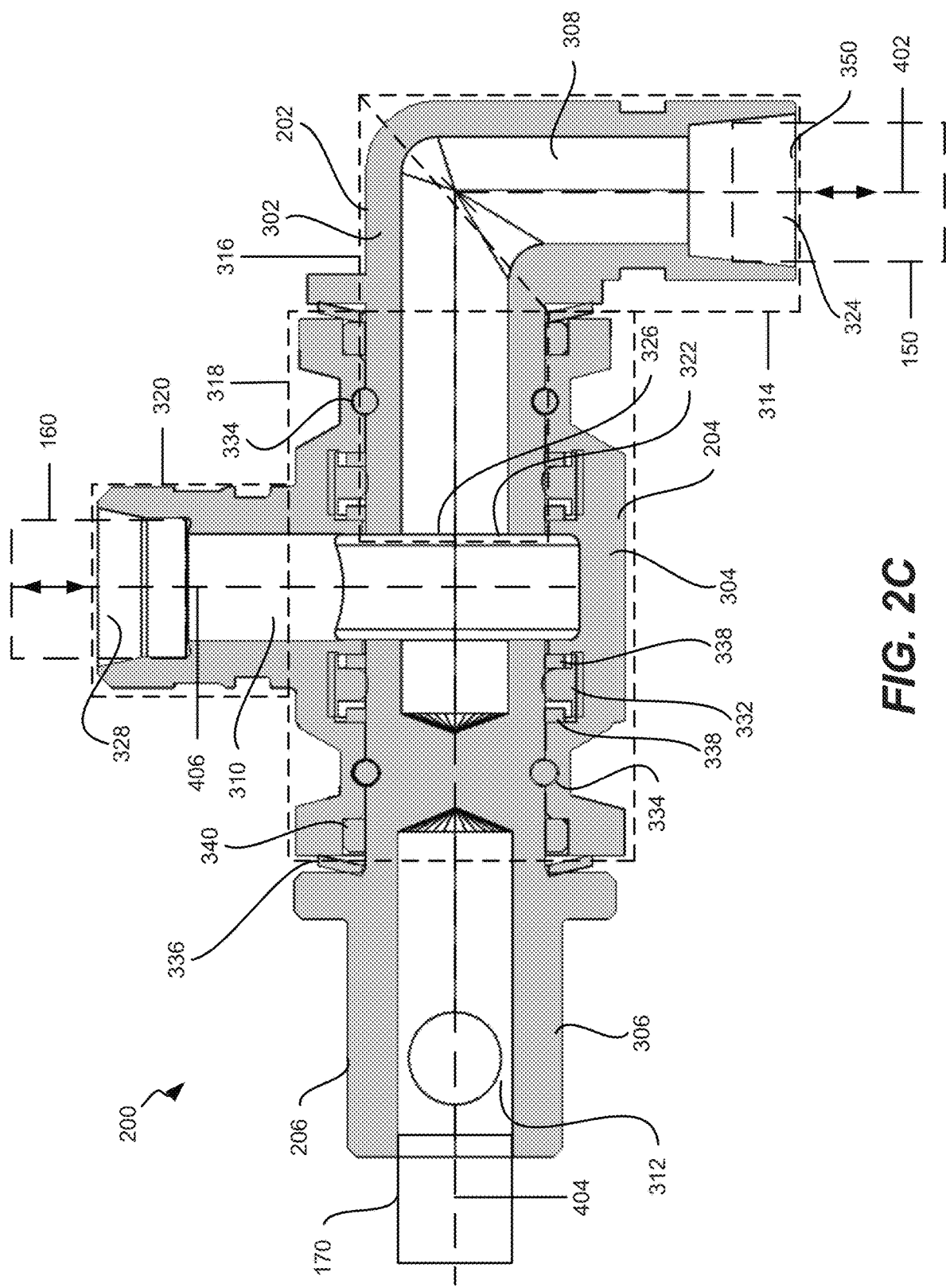

FIG. 2A illustrates a perspective view of a hydraulic swivel, in accordance with some examples. FIG. 2A illustrates aircraft hydraulic swivel 200 that includes first banjo 202, second banjo 204, and base 206. First banjo 202 is configured to move (e.g., rotate) relative to second banjo 204. Second banjo 204 may be additionally configured to move (e.g., rotate) relative to base 206. Thus, each of first banjo 202, second banjo 204, and base 206 are configured to be able to rotate relative to each other, allowing for adjustment of the angular positioning of various portions of first banjo 202, second banjo 204, and base 206, relative to each other (e.g., during operation of a vehicle such as an aircraft).

FIGS. 2B and 2C illustrate cutaway views of the hydraulic swivel of FIG. 2A, in accordance with some examples. The cutaway views of FIGS. 2B and 2C further illustrate various features of aircraft hydraulic swivel 200 and how the positioning of the various features are adjusted relative to one another. As shown, first banjo 202 includes first banjo body 302 and first banjo channel 308 disposed within first banjo body 302. First banjo channel 308 allows for a fluid (e.g., a liquid or gas) to flow within first banjo body 302.

Figure 3A:
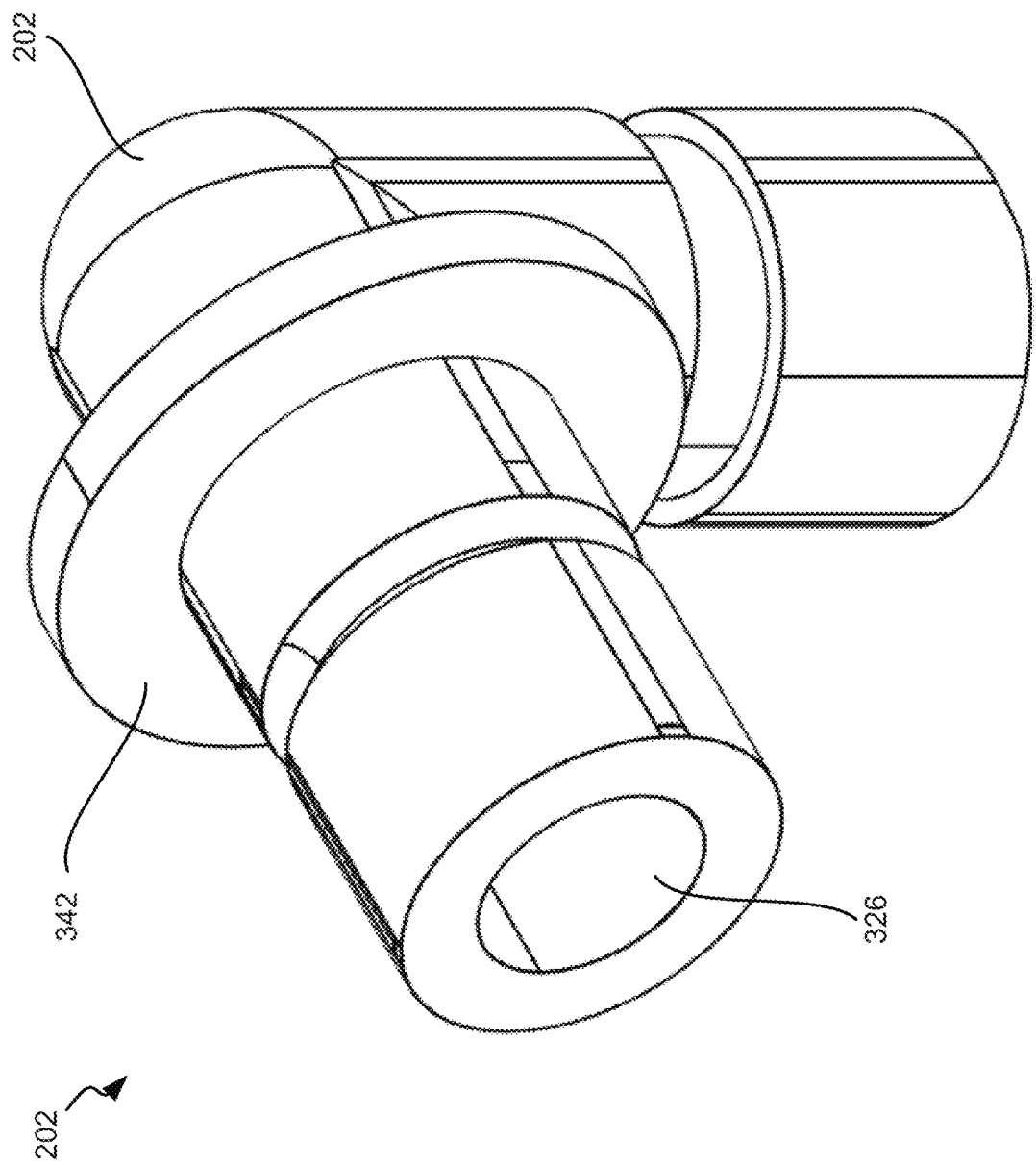
FIG. 3A illustrates a perspective view of a first banjo, in accordance with some examples.
Figure 4A:
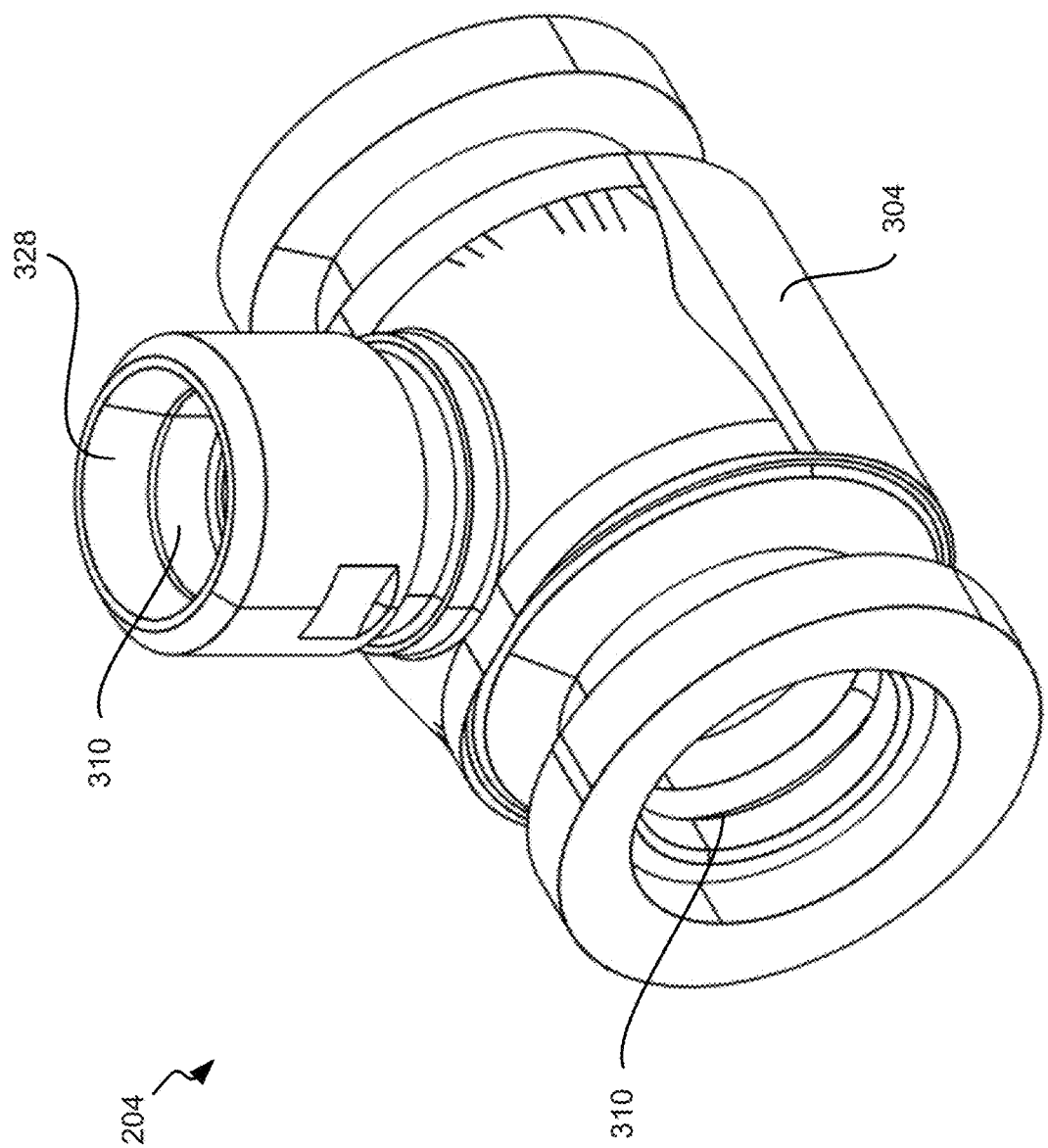
FIG. 4A illustrates a perspective view of a second banjo, in accordance with some examples.
Figure 5A:
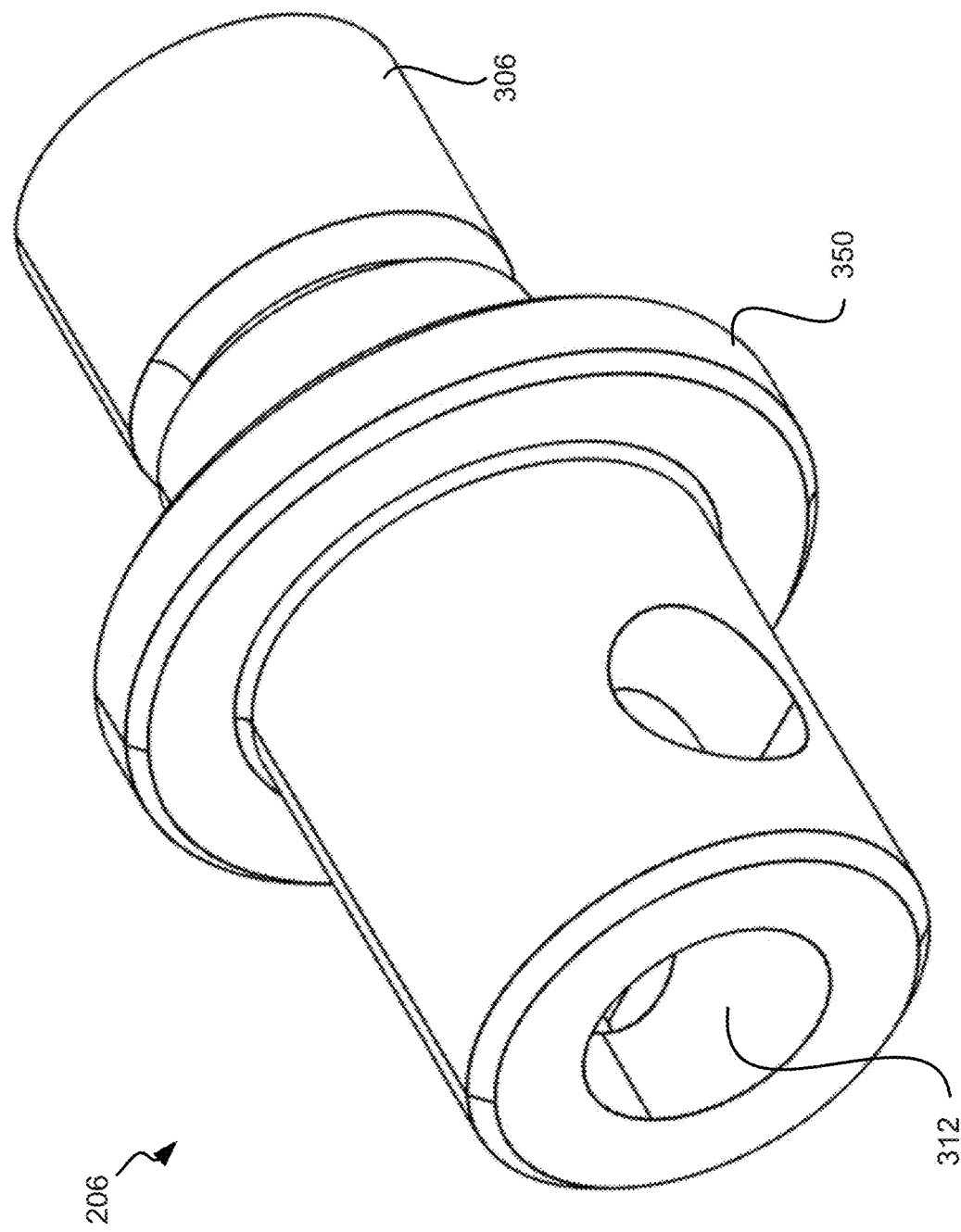
FIG. 5A illustrates a perspective view of a base, in accordance with some examples.
Figure 5B:
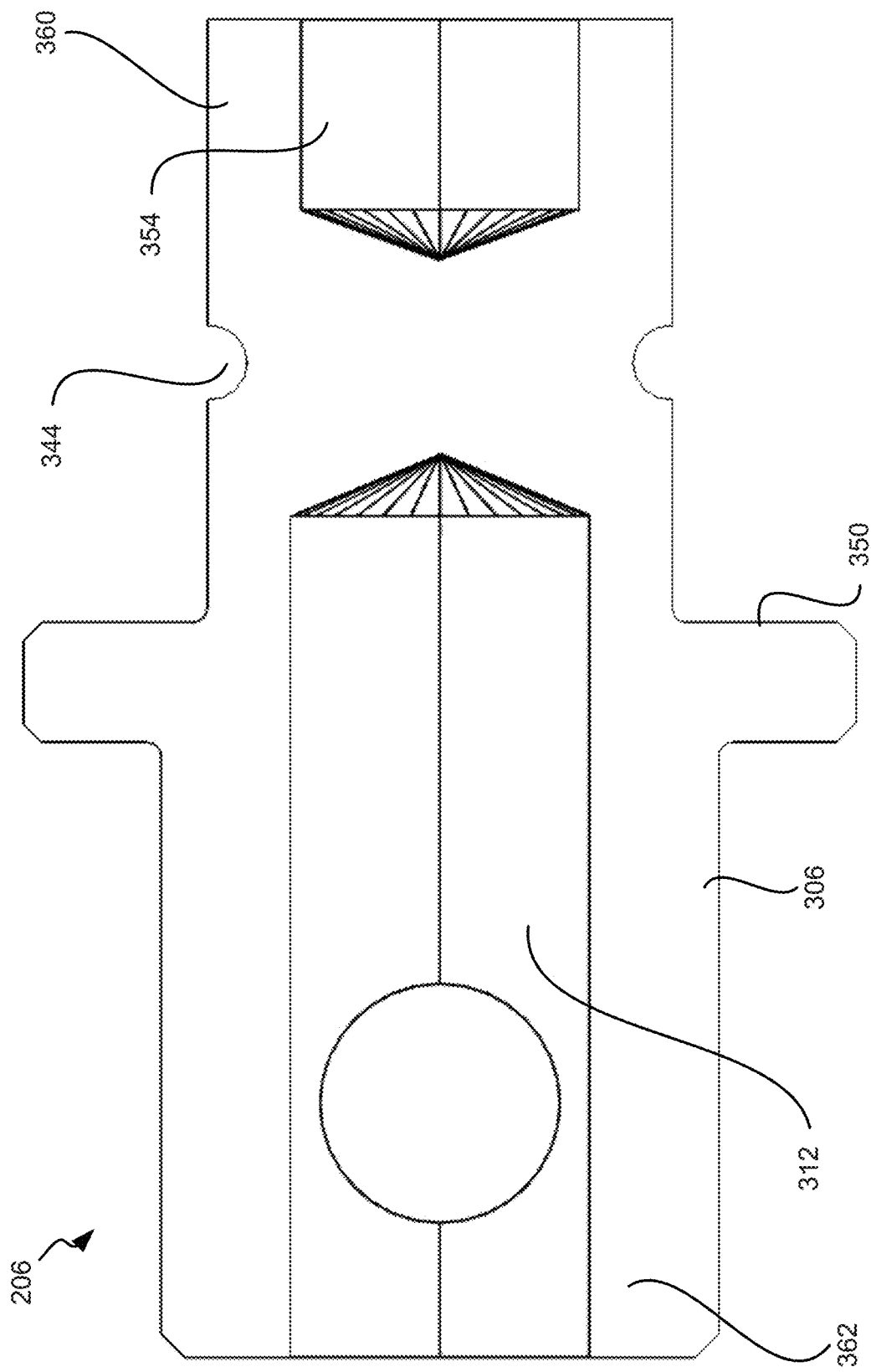
FIG. 5B illustrates a cutaway view of the base of FIG. 5A, in accordance with some examples.

Features of first banjo 202 described in FIGS. 2A-2C are further illustrated in FIGS. 3A and 3B. FIG. 3A illustrates a perspective view of a first banjo, in accordance with some examples. FIG. 3B illustrates a cutaway view of the first banjo of FIG. 3A, in accordance with some examples. Features of second banjo 204 described in FIGS. 2A-2C are further illustrated in FIGS. 4A and 4B. FIG. 4A illustrates a perspective view of a second banjo, in accordance with some examples. FIG. 4B illustrates a cutaway view of the second banjo of FIG. 4A, in accordance with some examples. Features of base 206 described in FIGS. 2A-2C are further illustrated in FIGS. 5A and 5B. FIG. 5A illustrates a perspective view of a base, in accordance with some examples. FIG. 5B illustrates a cutaway view of the base of FIG. 5A, in accordance with some examples.

As shown in FIGS. 2C and 3B, first banjo 202 includes first banjo first portion 314 and first banjo second portion 316. As shown, first banjo channel 308 includes channel opening 324 disposed on an end of first banjo first portion 314. Channel opening 324 is configured to be coupled to first hydraulic line 150 of aircraft 100. Flow thus enters/exits first banjo channel 308 through channel opening 324 from/into first hydraulic line 150.

First banjo first portion 314 is disposed at an angle to first banjo second portion 316. Thus, the portion of first banjo channel 308 within first banjo first portion 314 follows centerline 402, while the portion of first banjo channel 308 within first banjo second portion 316 follows centerline 404. As first banjo first portion 314 and first banjo second portion 316 are disposed at an angle relative to each other, centerlines 402 and 404 are not parallel to each other and instead intersect at an angle relative to each other. While the example shown in FIGS. 2A-C disposes centerlines 402 and 404 relative to each other at a 90 degree angle, other examples will dispose centerlines 402 and 404 at other angles (e.g., 15 degrees, 30 degrees, 45 degrees, 60 degrees, 120 degrees, or other such angles).

As such, in the example shown in FIG. 2C, fluid flowing within first banjo channel 308 enters first banjo channel 308 flowing in a first direction and exits first banjo channel 308 flowing in a second direction. Thus, for example, first banjo first portion 314 includes first end 370 and first banjo second portion 316 includes second end 322. First banjo channel 308 extends from first end 370 to second end 322. Fluid accordingly enters first banjo channel 308 at first end 370, changes a direction of flow (e.g., change a direction of flow by 90 degrees) proximate to where centerlines 402 and 404 intersect, and exits first banjo channel 308 at second end 322. Other directions e.g., opposite directions) of fluid flow is used in other examples.

In the example shown in FIG. 2C, second banjo channel 310 is fluidically coupled to the first banjo channel 308. Thus, fluid exiting first banjo channel 308 enters second banjo channel 310. Second banjo channel 310 is disposed within second banjo body 304 of second banjo 204. As shown in FIGS. 2C and 4B, second banjo 204 includes second banjo first portion 318 and second banjo second portion 320. Second banjo first portion 318 is disposed relative to second banjo second portion 320 in a T manner. The portion of second banjo channel 310 of second banjo second portion 320 intersects the portion of second banjo channel 310 of second banjo first portion 318 at an angle (e.g., in the T manner as shown in FIG. 2C). Other examples will dispose second banjo first portion 318 and second banjo second portion 320 and/or the portions of second banjo channel 310 relative to each other at different angles.

Various portions of second banjo first portion 318 are coupled to first banjo 202 and base 206 and configured to allow rotation between first banjo 202 and base 206, respectively. The portions of first banjo 202 and second banjo 204 that are coupled together and the portions of second banjo 204 and base 206 that are coupled together are cylindrically shaped to allow for rotation relative to each other without binding.

Second banjo first portion 318 includes first side 356 and second side 358. First side 356 is coupled to first banjo second portion 316 to allow for relative rotation between first banjo 202 and second banjo 204. Second side 358 is coupled to base 206 to allow for relative rotation between base 206 and second banjo 204. As shown in FIG. 4B, second banjo first portion 318 includes body opening 346. As shown, body opening 346 is substantially cylindrical (e.g., close to or fully cylindrical). At least a portion of the first banjo second portion 316 and at least a portion of the base 206 are disposed within the body opening 346. While the example shown in FIGS. 2B and 2C disposes first side 356 and second side 358 outside of first banjo second portion 316 and base 206, other examples dispose first, banjo second portion 316 and base 206 outside of first side 356 and second side 358.

Fluid flowing within first banjo channel 308 enters/exits second banjo channel 310 through opening 326 of second banjo channel 310. Due to the shape of second banjo channel 310, fluid that continues to flow into/out of second banjo channel 310 will further change an angle of flow (e.g., when flowing into second banjo second portion 320) relative to the angle of flow within first banjo channel 308 of first banjo second portion 316. As such, fluid that flows into or out of first banjo channel 308 into second banjo channel 310 changes direction and follows centerline 406, which is oriented at an angle to centerline 404.

Second banjo channel 310 includes channel opening 328 disposed on an end of second banjo second portion 320. Channel opening 328 is configured to be coupled to second hydraulic line 160 of aircraft 100. Flow thus enters/exits second banjo channel 310 through channel opening 328 from/into second hydraulic line 160. In certain examples, base 206 also includes channel 354 that is fluidically coupled to first banjo channel 308 and second banjo channel 310.

In certain conventional examples, both banjos are disposed over the base. In such examples, fluid first enters a first channel within the first banjo before flowing into a second channel within the base before then flowing into a third channel within the second banjo. In such a configuration, a plurality of seals are required on either side of the interface between the first channel and the second channel as well as on either side of the interface between the second channel and the third channel. By contrast, the examples described herein significantly reduce the number of seals.

In various examples, second banjo 204 includes grooves 348 disposed on either side of second banjo second portion 320. Grooves 348 are each configured to receive seals 332. Seals 332 prevent leaks from first banjo channel 308 and/or second banjo channel 310 while allowing for movement between first banjo 202, second banjo 204, and/or base 206. Thus, the examples described herein only require two seals to prevent leakage while allowing for movement, reducing by half the amount of seals required compared to conventional examples. Caps 208 are, in certain situations, disposed over channel openings 324 and/or 328 to prevent leakage or foreign object intrusion.

In various examples, grooves 348 additionally include back-up rings 338 disposed on either side of seal 332. Back-up rings 338 keep seals 332 in the required position and, in certain examples, provide additional sealing. Additionally, certain examples of aircraft hydraulic swivel 200 further includes additional components such as bearing rings 340 and shims 336. Bearing rings 340 and shims 336 provide further sealing and/or positioning for first banjo 202, second banjo 204, and/or base 206. Seals 330, in certain examples, are configured to provide an inward pressure on seals 332, improving sealing of seals 332.

Furthermore, first banjo 202 and base 206 includes stops 342 and 350. Stops 342 and 350 provide physical stops to further aid in positioning first banjo 202 and base 206 relative to second banjo 204.

In certain examples, aircraft hydraulic swivel 200 additionally includes wire locks 334. Wire locks 334 are disposed within grooves 344 of first banjo 202, second banjo 204, and base 206. When disposed within the respective grooves 344, wire locks 334 locate first banjo 202, second banjo 204, and/or base 206 relative to one another and prevent movement greater than a threshold amount along at least one axis of movement (e.g., along an axis parallel to centerlines 402, 404, and/or 406). Thus, as shown, one wire lock 334 couples together first banjo 202 and second banjo 204 and locates first banjo 202 are second banjo 204 along an axis parallel to centerline 404. Another wire lock 334 couples together second banjo 204 and base 206 and locates second banjo 204 and base 206 along an axis parallel to centerline 404.

Base 206 includes a first base end 360 and a second base end 362 disposed on either side of base 206. Second base end 362 is disposed on a second portion 306 of base 206. First base end 360 is coupled to second side 358 of second banjo 204. Second base end 362 is configured to be coupled to a mounting structure of aircraft 100. In certain examples, base channel 312 extends from second base end 362 and within second portion 306. Base channel 312 is fluidically independent of first banjo channel 308 and second banjo channel 310 (e.g., in contrast to being fluidically coupled, fluidically independent channels do not allow for a fluid to flow from one channel to the other). Base channel 312 is configured to interface with swivel mounting structure 170 of aircraft 100 by, for example, threading in, friction fit, welding, adhesion, and/or other techniques. Other examples will interface second base end 362 to the mounting structure through other techniques.

Technique of Using the Aircraft Hydraulic Swivel

Figure 6:
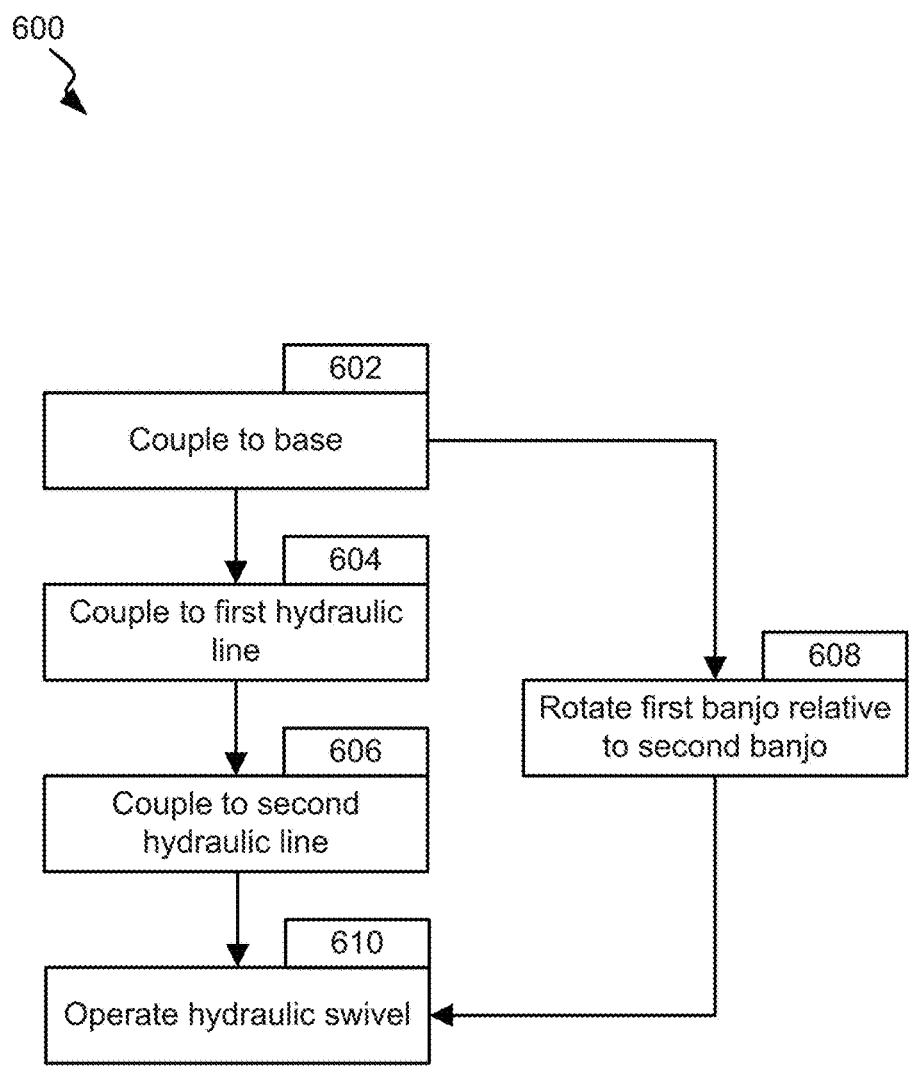
FIG. 6 illustrates a flow chart of an example of using the hydraulic swivel, in accordance with some examples.

FIG. 6 illustrates a flow chart of an example of using the hydraulic swivel, in accordance with some examples. Method 600 of FIG. 6 illustrates a technique where the hydraulic swivel is installed on and utilized during operation of an aircraft.

In step 602, the base of the hydraulic swivel is coupled to a portion of the aircraft. For example, a fitting of the aircraft is threaded into the base channel or otherwise inserted into the base channel, in certain examples. The hydraulic swivel is then accordingly securely fitted to the aircraft.

In step 604, a first hydraulic line of the aircraft is then coupled to the first banjo channel (e.g., threaded into first banjo channel, friction fitted, glued in, or otherwise fitted). In certain examples, the connection between the first hydraulic line and the first banjo channel is formed to prevent or minimize leakage of the fluid. In step 606, a second hydraulic line of the aircraft is then coupled to the second banjo channel. In certain examples, coupling of the second hydraulic line to the second banjo channel is performed in a manner similar to that of coupling the first hydraulic line to the first banjo channel. Fluid is then able to flow from the first hydraulic line into the first banjo channel before flowing into the second banjo channel and exiting the hydraulic swivel into the second hydraulic line.

In certain examples, while coupling the hydraulic swivel to the first hydraulic line and the second hydraulic line, the relative position between the first banjo and the second banjo is changed. Thus, for example, in step 608, the first banjo is rotated relative to the second banjo. In certain other examples, the second banjo is rotated relative to the base. The rotation of the various components of the hydraulic swivel is in accordance with the geometric requirements based on the positioning of the hydraulic lines and/or the fitting.

In step 610, the hydraulic swivel is operated. As such, fluid is communicated through the channels (e.g., the first banjo channel and the second banjo channel) of the hydraulic swivel. In certain examples, the various components of the hydraulic swivel are moved during operation, causing the first banjo, the second banjo, and/or the base to move (e.g., rotate) relative to each other during such operation. Thus, in a certain example, the first hydraulic line needs to be repositioned relative to the second hydraulic line during operation. The repositioning causes the first banjo to accordingly be repositioned (e.g., rotated) relative to the second banjo during such operation. As such, the first banjo is rotated relative to the second banjo, but in certain situations, hydraulic fluid continues to flow or remain within the first banjo channel and the second banjo channel during such repositioning.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 700 as shown in FIG. 7A and vehicle 100 as shown in FIG. 7B in applicable to such other contexts.

Figure 7A:
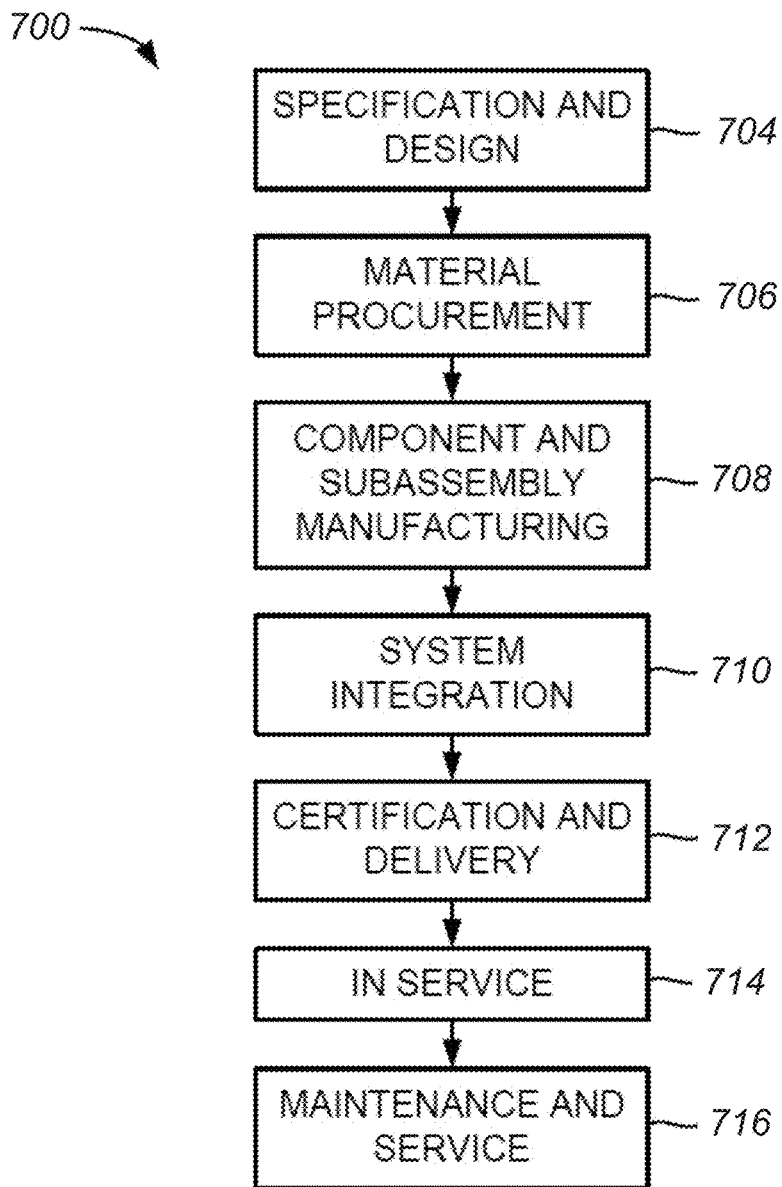
FIG. 7A illustrates a flow chart of an example of an aircraft production and service methodology, in accordance with some examples.

FIG. 7A illustrates a flow chart of an example of a vehicle production and service methodology, in accordance with some examples. In some examples, during pre-production, method 700 includes the specification and design 704 of vehicle 100 (e.g., an aircraft as shown in FIG. 1) and material procurement 706. During production, component and subassembly manufacturing 708 and system integration 710 of vehicle 100 takes place. Thereafter, vehicle 100 goes through certification and delivery 712 in order to be placed in service 714. While in service by a customer, the vehicle 100 is scheduled for routine maintenance and service 716 (e.g., modification, reconfiguration, refurbishment, and so on).

In certain examples, each of the processes of method 700 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator can be an airline, leasing company, military entity, service organization, and so on.

Figure 7B:
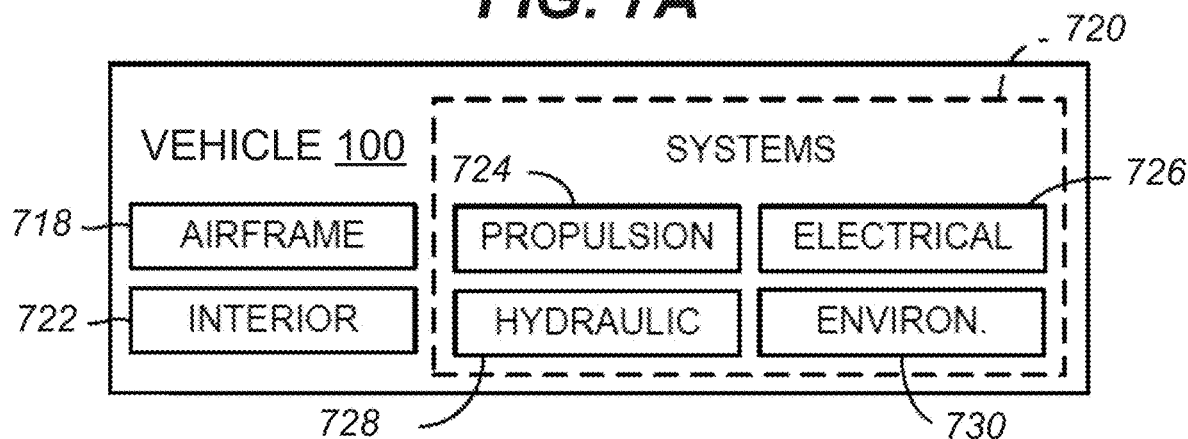
FIG. 7B illustrates a block diagram of an example of a vehicle, in accordance with some examples.

FIG. 7B illustrates a block diagram of an example of a vehicle, in accordance with some examples. As shown in FIG. 7B, the vehicle 100 (e.g., an aircraft) produced by method 600 includes airframe 718 with plurality of systems 720, and interior 722. Examples of systems 720 include one or more of propulsion system 724, electrical system 726, hydraulic system 728, and environmental system 730. In various examples, other systems are also included within vehicle 100. Although an aerospace example is shown, the principles of the embodiments disclosed herein is applicable to other industries, such as the automotive industry.

FURTHER EXAMPLES

Further, the disclosure includes examples according to the following clauses:

Clause 1. Aircraft 100, comprising:
first hydraulic line 150;
second hydraulic line 160; and
aircraft hydraulic swivel 200, comprising:
  first banjo 202, comprising:
    first banjo channel 308, fluidically coupled to first hydraulic line 150;
  base 206; and
  second banjo 204, comprising:
    second banjo first portion 318, comprising:
      first side 356, coupled to first banjo second portion 316, first side 356 configured to allow relative rotation between first banjo 202 and second banjo 204; and
      second side 358, coupled to base 206, second side 358 configured to allow relative rotation between base 206 and second banjo 204; and
    second banjo channel 310, fluidically coupled to first banjo channel 308 and second hydraulic line 160.

Clause 2. Aircraft 100 of clause 1, wherein first banjo 202 further comprises:
first banjo first portion 314, comprising first end 370; and
first banjo second portion 316, comprising second end 322 and disposed at an angle to first banjo first portion 314, wherein first banjo channel 308 extends from first end 370 to second end 322, and wherein base 206 is disposed substantially in line with first banjo second portion 316.

Clause 3. Aircraft 100 of clause 2, wherein second banjo first portion 318 further comprises body opening 346, and wherein at least a portion of first banjo second portion 316 and at least a portion of base 206 are disposed within body opening 346.

Clause 4. Aircraft 100 of clause 3 wherein body opening 346 is substantially cylindrical.

Clause 5. Aircraft 100 of clause 3, wherein second banjo 204 further comprises first groove 348 disposed on first side 356 and second groove 348 disposed on second side 358.

Clause 6. Aircraft 100 of clause 5, further comprising:
first seal 332, disposed within first groove 348; and
second seal 332, disposed within second groove 348.

Clause 7. Aircraft 100 of clause 2, wherein at least a portion of second banjo channel 310 is disposed at angle to first banjo second portion 316.

Clause 8. Aircraft 100 of clause 1, wherein second banjo 204 further comprises:
second banjo second portion 320, wherein second banjo channel 310 comprises channel opening 328 disposed on an end of second banjo second portion 320 opposite second banjo first portion 318.

Clause 9. Aircraft 100 of clause 1, wherein base 206 comprises:
first base end 360, coupled to second side 358;
second base end 362; and
base channel 312, fluidically independent of first banjo channel 308 and second banjo channel 310.

Clause 10. Aircraft 100 of clause 9, further comprising:
swivel mounting structure 170, wherein base channel 312 is configured to interface with swivel mounting structure 170.

Clause 11. Aircraft 100 of clause 9, further comprising:
wire lock 334, disposed between first banjo 202 and second banjo 204 and configured to locate first banjo 202 relative to second banjo 204 along at least one axis of movement.

Clause 12. Aircraft hydraulic swivel 200, comprising:
first banjo 202, comprising:
  first banjo channel 308;
base 206; and
second banjo 204, comprising:
  second banjo first portion 318, comprising:
    first side 356, coupled to first banjo second portion 316, first side 356 configured to allow relative rotation between first banjo 202 and second banjo 204; and
    second side 358, coupled to base 206, second side 358 configured to allow relative rotation between base 206 and second banjo 204;
  second banjo second portion 320; and
  second banjo channel 310, fluidically coupled to first banjo channel 308.

Clause 13. Aircraft hydraulic swivel 200 of clause 12, wherein first banjo 202 further comprises:
first banjo first portion 314, comprising first end 370; and first banjo second portion 316, comprising second end 322 and disposed at an angle to first banjo first portion 314, wherein first banjo channel 308 extends from first end 370 to second end 322, and wherein base 206 is disposed substantially in line with first banjo second portion 316.

Clause 14. Aircraft hydraulic swivel 200 of clause 13, wherein second banjo first portion 318 further comprises body opening 346, and wherein at least a portion of first banjo second portion 316 and at least a portion of base 206 are disposed within body opening 346.

Clause 15. Aircraft hydraulic swivel 200 of clause 14, wherein body opening 346 is substantially cylindrical.

Clause 16. Aircraft hydraulic swivel 200 of clause 14, wherein second banjo 204 further comprises first groove 348 disposed on first side 356 and second groove 348 disposed on second side 358.

Clause 17. Aircraft hydraulic swivel 200 of clause 16, further comprising:
first seal 332, disposed within first groove 348; and
second seal 332, disposed within second groove 348.

Clause 18. Aircraft hydraulic swivel 200 of clause 13, wherein at least a portion of second banjo channel 310 is disposed at an angle to first banjo second portion 316.

Clause 19. Aircraft hydraulic swivel 200 of clause 12, wherein second banjo 204 further comprises:
second banjo second portion 320, wherein second banjo channel 310 comprises channel opening 328 disposed on an end of second banjo second portion 320 opposite second banjo first portion 318.

Clause 20. Aircraft hydraulic swivel 200 of clause 12, wherein base 206 comprises:
first base end 360, coupled to second side 358;
second base end 362; and
base channel 312, fluidically independent of first banjo channel 308 and second banjo channel 310.

Clause 21. Aircraft hydraulic swivel 200 of clause 20, wherein base channel 312 is configured to interface with swivel mounting structure 170 of aircraft 100.

Clause 22. Aircraft hydraulic swivel 200 of clause 12, further comprising: wire lock 334, disposed between first banjo 202 and second banjo 204 and configured to locate first banjo 202 relative to second banjo 204 along at least one axis of movement.

Clause 23. Method 600, comprising:
coupling 604 first hydraulic line 150 of aircraft 100 to first banjo channel 308 of first banjo 202 of aircraft hydraulic swivel 200, wherein first banjo 202 comprises:
first banjo first portion 314, comprising first end 360; and
first banjo second portion 316, comprising second end 322 and disposed at angle to first banjo first portion 314, wherein first banjo channel 308 extends from first end 360 to second end 322; and
rotating 608 second banjo 204 of aircraft hydraulic swivel 200 relative to first banjo 202, wherein second banjo 204 comprises:
second banjo first portion 318, comprising first side 356 coupled to first banjo second portion 316 and second side 358 coupled to base 206 of aircraft hydraulic swivel 200;
second banjo second portion 320; and
second banjo channel 310, fluidically coupled to first banjo channel 308.

Clause 24. Method 600 of clause 23, further comprising:
coupling 602 base 206 of aircraft hydraulic swivel 200 to swivel mounting structure 170 of aircraft, wherein base 206 is disposed substantially in line with first banjo second portion 316 and is coupled to second side 358; and
coupling 606 second hydraulic line 160 to channel opening 328 of second banjo channel 310.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:
1. An aircraft, comprising:
a first hydraulic line;
a second hydraulic line; and
an aircraft hydraulic swivel, comprising:
a first banjo, comprising:
a first banjo channel, fluidically coupled to the first hydraulic line;
a base; and
a second banjo, comprising:
a second banjo first portion, comprising:
a first side, coupled to the first banjo, the first side configured to allow relative rotation between the first banjo and the second banjo; and
a second side, coupled to the base, the second side configured to allow relative rotation between the base and the second banjo;
a second banjo channel, fluidically coupled to the first banjo channel and the second hydraulic line; and
a wire lock, disposed between the first banjo and the second banjo and configured to locate the first banjo relative to the second banjo along at least one axis of movement.

2. The aircraft of claim 1, wherein the first banjo further comprises:
a first banjo first portion, comprising a first end; and
a first banjo second portion, comprising a second end and disposed at an angle to the first banjo first portion, wherein the first banjo channel extends from the first end to the second end, and wherein the base is disposed substantially in line with the first banjo second portion.

3. The aircraft of claim 2, wherein the second banjo first portion further comprises a body opening, and wherein at least a portion of the first banjo second portion and at least a portion of the base are disposed within the body opening.

4. The aircraft of claim 3, wherein the body opening is substantially cylindrical.

5. The aircraft of claim 3, wherein the second banjo further comprises a first groove disposed on the first side and a second groove disposed on the second side, and wherein the aircraft further comprises:
a first seal, disposed within the first groove; and
a second seal, disposed within the second groove.

6. The aircraft of claim 2, wherein at least a portion of the second banjo channel is disposed at an angle to the first banjo second portion.

7. The aircraft of claim 1, wherein the second banjo further comprises:
a second banjo first portion;

a second banjo second portion, wherein the second banjo channel comprises a channel opening disposed on an end of the second banjo second portion opposite the second banjo first portion.

8. The aircraft of claim 1, wherein the base comprises:
a first base end, coupled to the second side;
a second base end; and
a base channel, fluidically independent of the first banjo channel and the second banjo channel, and wherein the aircraft further comprises:
a swivel mounting structure, wherein the base channel is configured to interface with the swivel mounting structure.

9. The aircraft of claim 1, wherein the second banjo further comprises a groove disposed on the first side, and wherein the aircraft further comprises:
a first seal, disposed within the groove.

10. An aircraft hydraulic swivel, comprising:
a first banjo, comprising:
a first banjo channel;
a base;
a second banjo, comprising:
a second banjo first portion, comprising:
a first side, coupled to the first banjo, the first side configured to allow relative rotation between the first banjo and the second banjo; and
a second side, coupled to the base, the second side configured to allow relative rotation between the base and the second banjo; and
a second banjo channel, fluidically coupled to the first banjo channel; and
a wire lock, disposed between the first banjo and the second banjo and configured to locate the first banjo relative to the second banjo along at least one axis of movement.

11. The aircraft hydraulic swivel of claim 10, wherein the first banjo further comprises:
a first banjo first portion, comprising a first end; and
a first banjo second portion, comprising a second end and disposed at an angle to the first banjo first portion, wherein the first banjo channel extends from the first end to the second end, and wherein the base is disposed substantially in line with the first banjo second portion.

12. The aircraft hydraulic swivel of claim 11, wherein the second banjo first portion further comprises a body opening, and wherein at least a portion of the first banjo second portion and at least a portion of the base are disposed within the body opening.

13. The aircraft hydraulic swivel of claim 12, wherein the body opening is substantially cylindrical.

14. The aircraft hydraulic swivel of claim 12, wherein the second banjo further comprises a first groove disposed on the first side and a second groove disposed on the second side, and wherein the aircraft hydraulic swivel further comprises:
a first seal, disposed within the first groove; and
a second seal, disposed within the second groove.

15. The aircraft hydraulic swivel of claim 11, wherein at least a portion of the second banjo channel is disposed at an angle to the first banjo second portion.

16. The aircraft hydraulic swivel of claim 10, wherein the second banjo further comprises:
a second banjo second portion, wherein the second banjo channel comprises a channel opening disposed on an end of the second banjo second portion opposite the second banjo first portion.

17. The aircraft hydraulic swivel of claim 10, wherein the base comprises:
a first base end, coupled to the second side;
a second base end; and
a base channel, fluidically independent of the first banjo channel and the second banjo channel, wherein the base channel is configured to interface with a swivel mounting structure of an aircraft.

18. The aircraft hydraulic swivel of claim 10, wherein the second banjo further comprises a groove disposed on the first side, and wherein the aircraft hydraulic swivel further comprises:
a first seal, disposed within the groove.

19. A method, comprising:
coupling a first hydraulic line of an aircraft to a first banjo channel of a first banjo of an aircraft hydraulic swivel, wherein the first banjo comprises:
a first banjo first portion, comprising a first end; and
a first banjo second portion, comprising a second end and disposed at an angle to the first banjo first portion, wherein the first banjo channel extends from the first end to the second end;
rotating a second banjo of the aircraft hydraulic swivel relative to the first banjo, wherein the second banjo comprises:
a second banjo first portion, comprising a first side coupled to the first banjo second portion and a second side coupled to a base of the aircraft hydraulic swivel, wherein the first side and the first banjo second portion each are cylindrically shaped to allow relative coupling and rotation there between without binding;
a second banjo second portion; and
a second banjo channel, fluidically coupled to the first banjo channel;
locking a wire lock, disposed between the first banjo and the second banjo and configured to locate the first banjo relative to the second banjo along at least one axis of movement.

20. The method of claim 19, further comprising:
coupling a base of the aircraft hydraulic swivel to a swivel mounting structure of the aircraft, wherein the base is disposed substantially in line with the first banjo second portion and is coupled to the second side; and
coupling a second hydraulic line to a channel opening of the second banjo channel.

* * * * *